(12) United States Patent
Kim

(10) Patent No.: US 10,728,478 B2
(45) Date of Patent: Jul. 28, 2020

(54) ELECTRONIC DEVICE

(71) Applicant: SK hynix Inc., Gyeonggi-do (KR)

(72) Inventor: Tae-Gyu Kim, Gyeonggi-do (KR)

(73) Assignee: SK hyinx Inc., Gyeonggi-do (KR)

( * ) Notice: Subject to any disclaimer, the term of this patent is extended or adjusted under 35 U.S.C. 154(b) by 71 days.

(21) Appl. No.: 16/190,845

(22) Filed: Nov. 14, 2018

(65) Prior Publication Data

US 2019/0306446 A1   Oct. 3, 2019

(30) Foreign Application Priority Data

Mar. 29, 2018  (KR) ........................ 10-2018-0036863

(51) Int. Cl.
*H04N 5/369*   (2011.01)
*H04N 5/376*   (2011.01)

(52) U.S. Cl.
CPC .................................. *H04N 5/369* (2013.01)

(58) Field of Classification Search
CPC ...... H04N 5/369; H04N 5/376; H04N 5/3745; H04N 5/3651; H04N 5/374

USPC ...................................................... 250/208.1
See application file for complete search history.

(56) References Cited

U.S. PATENT DOCUMENTS

RE38,685 E  *  1/2005  Casper ................. G11C 7/1051
                                                                    257/295
8,294,448 B2 * 10/2012  Nakakubo ........... G11C 11/4074
                                                                    323/299

FOREIGN PATENT DOCUMENTS

KR   101333749     11/2013
KR   101769677      8/2017

* cited by examiner

*Primary Examiner* — Seung C Sohn
(74) *Attorney, Agent, or Firm* — IP & T Group LLP

(57) ABSTRACT

An electronic device includes a driving circuit suitable for driving an output node with an input voltage signal based on a control voltage applied to a control node, a boost circuit suitable for boosting voltage of the output node based on an output boost signal, and a compensating circuit suitable for applying the control voltage to the control node based on control signals to compensate for voltage drop caused by the driving circuit.

20 Claims, 3 Drawing Sheets

ELECTRONIC DEVICE

CROSS-REFERENCE TO RELATED APPLICATION

This application claims priority under 35 U.S.C. § 119 to Korean Patent Application No. 10-2018-0036863, filed on Mar. 29, 2018, in the Korean Intellectual Property Office, the disclosure of which is incorporated herein by reference in its entirety.

BACKGROUND

1. Field

Embodiments of the present invention relate to a semiconductor design technique, and more particularly, to an electronic device capable of generating a boosted signal.

2. Description of the Related Art

Electronic devices may generate and use an internally boosted signal to improve operational reliability. For example, image sensing devices use a boosted signal when transferring a charge accumulated in a photodiode to a floating diffusion node, or use the boosted signal when resetting the floating diffusion node with a source voltage.

Image sensing devices capture images using photosensitive properties of semiconductors. Image sensing devices are often classified into charge-coupled device (CCD) image sensors and complementary metal-oxide semiconductor (CMOS) image sensors. CMOS image sensors allow both analog and digital control circuits to be integrated in a single integrated circuit (IC), making CMOS image sensors the most widely used type of image sensor.

SUMMARY

Various embodiments of the present invention are directed to an electronic device capable of generating a boosted signal based on signals having a normal activation level rather than a boosted voltage.

In accordance with an embodiment of the present invention, an electronic device includes: a driving circuit suitable for driving an output node with an input voltage signal based on a control voltage applied to a control node; a boost circuit suitable for boosting voltage of the output node based on an output boost signal; and a compensating circuit suitable for applying the control voltage to the control node based on control signals to compensate for voltage drop caused by the driving circuit.

An activation level of an output voltage signal generated through the output node may be higher than an activation level of the input voltage signal.

An activation level of each of the control signals and an activation level of the output boost signal may have a voltage level corresponding to an activation level of the input voltage signal.

The driving circuit may operate for a driving period, and the boost circuit may operate for a boost period subsequent to the driving period.

The driving period and the boost period may be continuous without a gap.

The driving circuit may include a first driving element, the boost circuit may include a first boost element, and capacitance of the first boost element may be set in consideration of parasitic capacitance of a load coupled to the output node.

The control signals may include first to third control and the compensating circuit may include: a second driving element suitable for driving the control node with the first control signal based on the second control signal; and a second boost element suitable for boosting the control node as much as an activation level of the first control signal based on the third control signal.

The second driving element may operate for a precharge period, and the second boost element may operate for a compensating period subsequent to the precharge period.

In accordance with an embodiment of the present invention, an electronic device includes: a first driving element coupled between an input node to which an input voltage signal is applied and an output node through which an output voltage signal is outputted, the first driving element operating based on a control voltage applied to a control node; a first boost element coupled between the output node and a first node to which an output boost signal is inputted; a second driving element coupled between a second node to which a first control signal is inputted and the control node, and operating based on a second control signal; and a second boost element coupled between the control node and a third node to which a third control signal is inputted.

An activation level of the output voltage signal may be greater than an activation level of the input voltage signal.

Each of an activation level of the first control signal, an activation level of the second control signal, an activation level of the third control signal and an activation level of the output boost signal may have a voltage level corresponding to an activation level of the input voltage signal.

The first and second driving elements and the first boost element may operate for a driving period, and the second boost element may operate for a boost period subsequent to the driving period.

The driving period and the boost period may be continuous without a gap.

The first driving element may drive the output node with an activation level of the input voltage signal for an initial driving period of a driving period, which also includes a medium driving period and a last driving period, the first boost element may boost the output node as much as an activation level of the output boost signal for a boost period subsequent to the driving period, the second driving element may drive the control node with an activation level of the first control signal for an initial precharge period prior to the driving period, drive the control node with a deactivation level of the first control signal for the last driving period, and drive the control node with the activation level of the first control signal for a last precharge period subsequent to the boost period, and the second boost element may boost the control node as much as an activation level of the third control signal for the medium driving period.

Capacitance of the first boost element may be set in consideration of parasitic capacitance of a load coupled to the output node.

In accordance with an embodiment of the present invention, an electronic device includes: a pixel array suitable for generating pixel signals based on a reset control signal, a transmission control signal and a selection control signal; and a controller suitable for generating any one of the reset control signal, the transmission control signal and the selection control signal based on a supply voltage, and generating remaining signals among the reset control signal, the transmission control signal and the selection control signal based on various signals generated for a set period instead of the supply voltage, wherein each of the various signals has a first activation level, wherein each of the remaining signals has a second activation level that is greater than the first activation level.

The various signals may include an input voltage signal, an output boost signal and the first to third control signals, and the controller may include: a first driving element coupled between an input node to which the input voltage signal is applied and an output node where the remaining signals are generated, and operating based on a control voltage applied to a control node; a first boost element coupled between the output node and a first node to which the output boost signal is inputted; a second driving element coupled between a second node to which a first control signal is inputted and the control node, and operating based on a second control signal; and a second boost element coupled between the control node and a third node to which a third control signal is inputted.

Capacitance of the first boost element may be set in consideration of parasitic capacitance of the pixel array coupled to the output node.

The pixel array may include pixels for generating the pixel is signals, and switching elements included in each of the pixels and the first and second driving elements may include the same type of transistors.

The first driving element may drive the output node with an activation level of the input voltage signal for an initial driving period of a driving period, which also includes a medium driving period and a last driving period, the first boost element may boost the output node as much as an activation level of the output boost signal for a boost period subsequent to the driving period, the second driving element may drive the control node with an activation level of the first control signal for an initial precharge period prior to the driving period, drive the control node with a deactivation level of the first control signal for the last driving period, and drive the control node with the activation level of the first control signal for a last precharge period subsequent to the boost period, and the second boost element may boost the control node as much as an activation level of the third control signal for the medium driving period.

DETAILED DESCRIPTION

Various embodiments of the present invention will be described below in more detail with reference to the accompanying drawings. These embodiments are provided so that this disclosure is thorough and complete. All "embodiments" referred to in this disclosure refer to embodiments of the inventive concept disclosed herein. That said, reference to "an embodiment" or the like is not necessarily to only one embodiment, and different references to any such phrase are not necessarily to the same embodiment(s). The embodiments presented are merely examples and are not intended to limit the scope of the invention.

Moreover, it is noted that the terminology used herein is for the purpose of describing the embodiments and is not intended to be limiting of the invention. As used herein, singular forms are intended to include the plural forms and vice versa, unless the context clearly indicates otherwise. It will be further understood that the terms "comprises," "comprising," "includes" and/or "including" when used in this specification, indicate the presence of stated features, but do not preclude the presence or addition of one or more other non-stated features. As used herein, the term "and/or" indicates any and all combinations of one or more of the associated listed items. It is also noted that in this specification, "connected/coupled" refers to one component not only directly coupling another component but also indirectly coupling another component through one or more intermediate components.

It will be understood that, although the terms "first", "second", "third", and so on may be used herein to identify various elements, these elements are not limited by these terms. These terms are used to distinguish one element from another element that otherwise have the same or similar names. Thus, a first element described below could also be termed as a second or third element without departing from the spirit and scope of the present invention.

The drawings are not necessarily to scale and, in some instances, proportions may have been exaggerated in order to clearly illustrate features of the embodiments.

Figure 1:
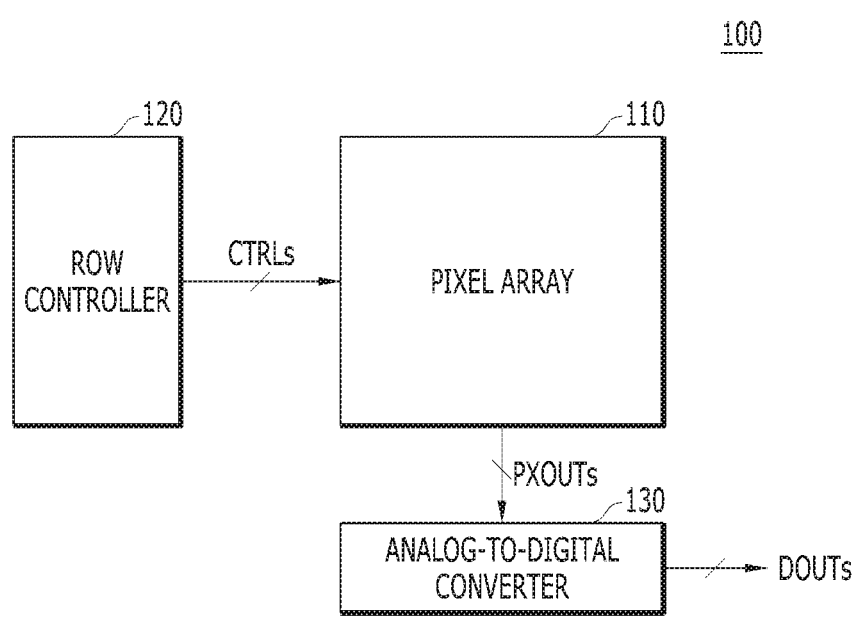
FIG. 1 is a block diagram illustrating an electronic device in accordance with an embodiment of the present invention.

FIG. 1 is a block diagram illustrating an electronic device 100 in accordance with an embodiment of the present invention.

Referring to FIG. 1, the electronic device 100 may include a pixel array 110, a row controller 120, and an analog-to-digital converter 130.

The pixel array 110 may generate pixel signals PXOUTs in units of rows based on row control signals CTRLs. Although not illustrated, the pixel array 110 may include a plurality of pixels arranged in row and column directions.

The row controller 120 may generate the row control signals CTRLs for controlling the pixel array 110 in units of rows. The row control signals CTRLs may include control signals which are allocated for each row of the pixel array 110. The control signals may include a reset control signal RX, a transmission control signal TX, and a selection control signal SX, which are described below. For example, the row controller 120 generates any one of the reset control signal RX, the transmission control signal TX and the selection control signal SX based on a supply voltage (not illustrated). Further, the row controller 120 generates remaining control signals based on various signals (e.g., V1, SC1, SC2, SC3 and SC4 shown in FIG. 3) which are generated for a set or predetermined period instead of the supply voltage. The remaining control signals are boosted signals, which have activation levels higher or greater than activation levels of the signals V1, SC1, SC2, SC3 and SC4. The supply voltage may be an external voltage that is continuously supplied from an outside of the electronic device 100, or an internal voltage that is generated and supplied within the electronic device 100.

The analog-to-digital converter 130 may convert the pixel is signals PXOUTs into digital signals DOUTs.

Figure 2:
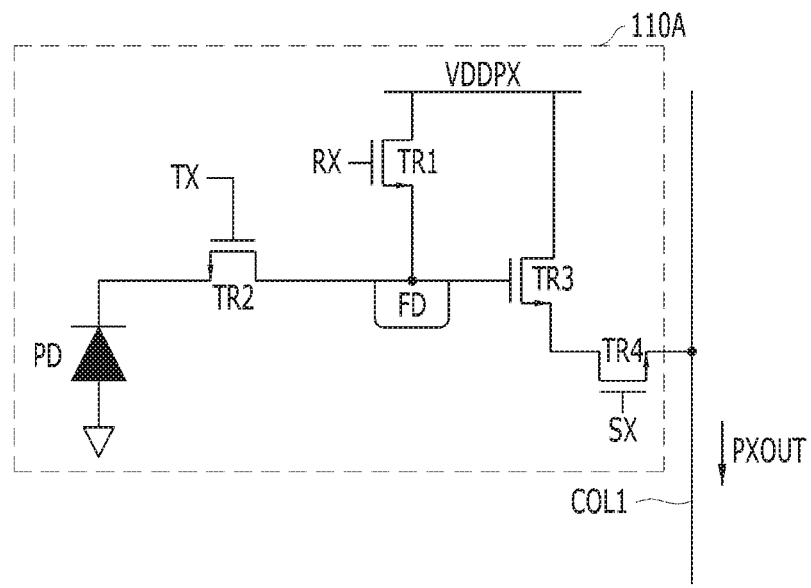
FIG. 2 is a circuit diagram illustrating a pixel of a pixel array in accordance with an embodiment of the present invention.

FIG. 2 is a circuit diagram illustrating a pixel in accordance with an embodiment of the present invention, for example, a pixel of the pixel array 110 shown in FIG. 1. For clarity, FIG. 2 representatively illustrates one pixel 110A coupled to the column line COL1 of the plurality of pixels included in the pixel array 110.

Referring to FIG. 2, the pixel 110A may include a photodiode PD, a floating diffusion node FD, a reset element TR1, a transmission element TR2, a driving element TR3, and a selection element TR4. Elements TR1, TR2, TR3, and TR4 may be transistors.

The photodiode PD may generate a photocharge based on incident light for an exposure period.

The floating diffusion node FD may accumulate the photocharge. A parasitic capacitor (not illustrated) may be coupled to the floating diffusion node FD. The parasitic capacitor accumulates the photocharge.

The reset element TR1 may reset the floating diffusion node FD with a source voltage VDDPX based on the reset control signal RX. For example, the reset element TR1 includes an NMOS transistor having a gate receiving the reset control signal RX, a drain coupled to a voltage terminal for a source voltage VDDPX and a source coupled to the floating diffusion node FD.

The transmission element TR2 may transmit the photocharge to the floating diffusion node FD based on the transmission control signal TX. For example, the transmission element TR2 includes an NMOS transistor having a gate receiving the transmission control signal TX, a drain coupled to the floating diffusion node FD and a source coupled to the photodiode PD.

The driving element TR3 may drive one side of the selection element TR4 with the source voltage VDDPX based on a voltage loaded onto the floating diffusion node FD. For example, the driving element TR3 includes an NMOS transistor having a gate coupled to the floating diffusion node FD, a drain coupled to the voltage terminal for the source voltage VDDPX and a source coupled to the selection element TR4.

The selection element TR4 may output the pixel signal PXOUT to the analog-to-digital converter 130 of FIG. 1 through the column line COL1 based on the selection control signals SX. For example, the selection element TR4 includes an NMOS transistor having a gate receiving the selection control signal SX, a drain coupled to the driving unit TR3 and a source coupled to the column line COL1.

Figure 3:
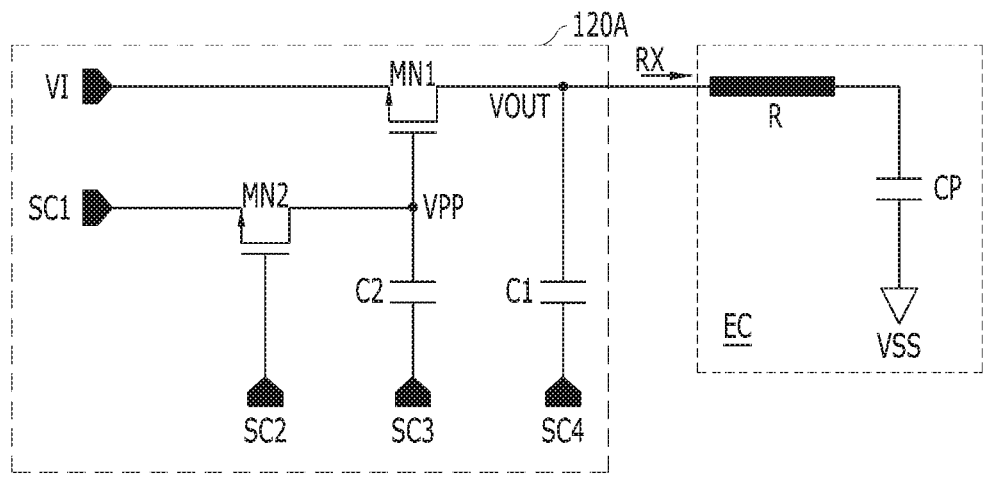
FIG. 3 is a circuit diagram illustrating a circuit of a row controller in accordance with an embodiment of the present invention.

FIG. 3 is a circuit diagram illustrating a row controller in accordance with an embodiment of the present invention, for example, a portion of the row controller 120 shown in FIG. 1. For clarity, FIG. 3 illustrates a circuit 120A for generating the reset control signal RX included in the row controller 120. FIG. 3 illustrates an equivalent circuit EC of pixels arranged in a single row, where the pixels receive the reset control signal RX.

Referring to FIG. 3, the circuit 120A may include a driving circuit MN1, a boost circuit C1, and a compensating circuit including MN2 and C2.

The driving circuit MN1 may drive an output node VOUT with an input voltage signal VI based on a control voltage applied to a control node VPP. For example, the driving circuit MN1 includes an NMOS transistor coupled between an input node to which the input voltage signal VI is applied and the output node VOUT where the reset control signal RX is outputted and having a gate coupled to the control node VPP. The driving circuit MN1 is referred to as a "first driving element".

The boost circuit C1 may boost the output node VOUT based on an output boost signal SC4. For example, the boost circuit C1 includes a capacitor coupled between the output node VOUT and a first node to which the output boost signal SC4 is inputted. Capacitance of the capacitor included in the boost circuit C1 may be set considering parasitic capacitance CP of the equivalent circuit EC coupled to the output node VOUT. The boost circuit C1 is referred to as a "first boost element".

The compensating circuit MN2 and C2 may apply the control voltage for compensating for voltage drop occurring due to the driving circuit MN1 to the control node VPP based on first to third control signals SC1, SC2 and SC3. For example, the compensating circuit MN2 and C2 includes a second driving element MN2 and a second boost element C2.

The second driving element MN2 may drive the control node VPP with the first control signal SC1 based on the second control signal SC2. For example, the second driving element MN2 includes an NMOS transistor coupled between the control node VPP and a second node to which the first control signal SC1 is inputted and operating based on the second control signal SC2.

The second boost element C2 may boost the control node VPP as high as an activation level of the first control signal SC1 based on the third control signal SC3. The second boost element C2 may include a capacitor coupled between the control node VPP and a third node to which the third control signal SC3 is inputted.

Switching elements included in each of the pixels, that is, the reset element TR1, the transmission element TR2, the driving element TR3 and the selection element TR4, and switching elements included in the row controller 120, that is, the first driving element MN1 and the second driving element MN2 may each include the same type of a transistor, namely, an NMOS transistor.

An operation of the electronic device 100 having the above-described structure in accordance with an embodiment of the present invention is described with reference to FIGS. 4 and 5.

Figure 4:
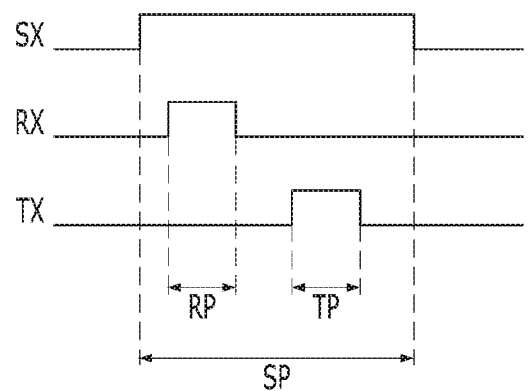
FIG. 4 is a timing diagram illustrating an operation of an electronic device in accordance with an embodiment of the present invention.

FIG. 4 is a timing diagram illustrating an operation of an electronic device in accordance with an embodiment of the present invention, for example, the electronic device 100 shown in FIG. 1. For clarity, FIG. 4 illustrates a timing diagram of a process of controlling pixels arranged in a single row among the pixels included in the pixel array 110 of FIG. 1.

Referring to FIG. 4, the row controller 120 may generate the reset control signal RX, the transmission control signal TX and the selection control signal SX for a single row time period. For example, the row controller 120 activates the selection control signal SX to a logic high level for the single row time period SP, activates the reset control signal RX to a logic high level for a reset period RP, and subsequently activates the transmission control signal TX to a logic high level for a transmission period TP.

The pixels arranged in the single row may simultaneously generate the pixel signals PXOUT based on the reset control signal RX, the transmission control signal TX and the selection control signal SX. An operation of one of the pixels arranged in the single row is representatively described in detail. Referring also to FIG. 2, the selection element TR4 may couple the driving element TR3 to the column line COL1 based on the selection control signal SX. The reset element TR1 may reset the floating diffusion node FD with the source voltage VDDPX based on the reset control signal RX for the reset period. The driving element TR3 may generate a reset signal corresponding to the voltage loaded onto the floating diffusion node FD for the reset period. The selection element TR4 may output the reset signal as the pixel signal PXOUT to the analog-to-digital converter 130 through the column line COL1. Continuously, the transmission element TR2 may transmit the photocharge to the floating diffusion node FD based on the transmission control signal TX for the transmission period. The driving element TR3 may generate a data signal corresponding to the voltage loaded onto the floating diffusion node FD for the transmission period. The selection element TR4 may output the data signal as the pixel signal PXOUT to the analog-to-digital converter 130 through the column line COL1.

Figure 5:
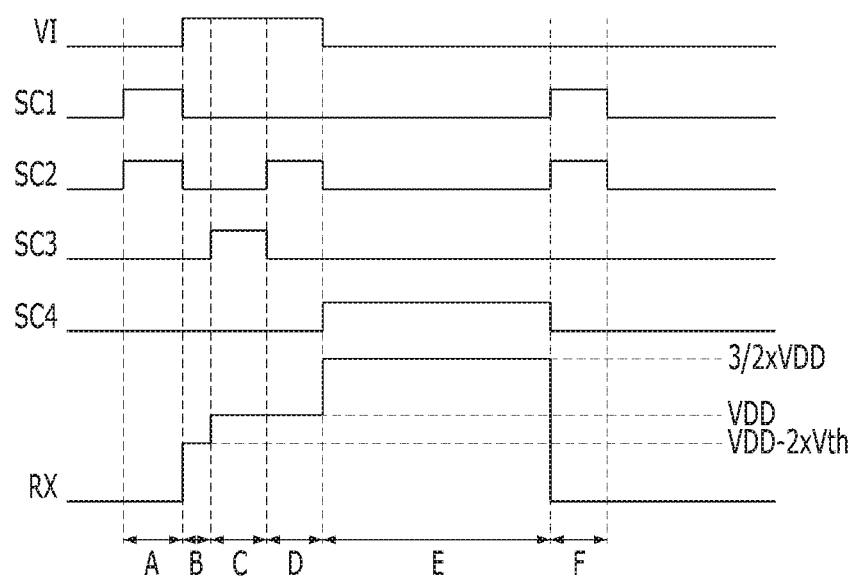
FIG. 5 is a timing diagram illustrating a generation process of a reset control signal in accordance with an embodiment of the present invention.

FIG. 5 is a timing diagram illustrating a generation process of a reset control signal in accordance with an embodiment of the present invention, for example, a generation process of the reset control signal RX shown in FIG. 4.

Referring to FIG. 5, the first and second control signals SC1 and SC2 may be activated to a logic high level for an initial precharge period A. The second driving element MN2 may drive the control node VPP with an activation level VDD of the first control signal SC1 for the initial precharge period A. The control node VPP may be charged to a voltage level {VDD−Vth} obtained by subtracting a threshold voltage Vth of the second driving element MN2 from the activation level VDD of the first control signal SC1 by the second boost element C2. Accordingly, the first driving element MN1 may drive the output node VOUT with the input voltage signal VI based on the control voltage applied (namely, charged) to the control node VPP. The output node VOUT may correspond to a deactivation level VSS of the input voltage signal VI. Consequently, the reset control signal RX may have the deactivation level VSS of the input voltage signal VI for the initial precharge period A.

For driving periods B, C and D subsequent to the initial precharge period A, the input voltage signal VI may be activated to a logic high level.

For an initial driving period B of the driving periods B, C and D, the first driving element MN1 may drive the output node VOUT with the input voltage signal VI based on the control voltage applied (namely, charged) to the control node VPP. The output node VOUT may be charged to a voltage level {VDD−2×Vth} obtained by subtracting a threshold value Vth of the first driving element MN1 and the threshold value Vth of the second driving element MN2 from an activation level VDD of the input voltage signal VI by the first boost element C1. Accordingly, the reset control signal RX may have the voltage level {VDD−2×Vth} obtained by subtracting the threshold value Vth of the first driving element MN1 and the threshold value Vth of the second driving element MN2 from the activation level VDD of the input voltage signal VI for the initial driving period B.

For a medium driving period C, which is a compensating period, of the driving periods B, C and D, the third control signal SC3 may be activated to a logic high level. The second boost element C2 may boost the control node VPP as high as an activation level VDD of the third control signal SC3. The control node VPP may have a voltage level {2×VDD−Vth} obtained by subtracting the threshold voltage Vth of the second driving element MN2 from the activation level VDD of the first control signal SC1 and adding the activation level VDD of the third control signal SC3. Accordingly, the first driving element MN1 may sufficiently drive the output node VOUT with the input voltage signal VI based on the control voltage applied (namely, boosted) to the control node VPP. In other words, the voltage drop occurring due to the driving circuit MN1 may be compensated. Consequently, the reset control signal RX may have the activation level VDD of the input voltage signal VI for the medium driving period C.

For a last driving period D of the driving periods B, C and D, the second control signal SC2 may be activated to a logic high level. The second driving element MN2 may drive the control node VPP with a deactivation level VSS of the first control signal SC1 for the last driving period D. The control node VPP may be discharged by the deactivation level VSS of the first control signal SC1. The reset control signal RX may maintain the same level VDD as the reset control signal RX of the medium driving period C by the first boost element C1 for the last driving period D.

For a boost period E subsequent to the driving periods B, C and D, the output boost signal SC4 may be activated to a logic high level. The first boost element C1 may boost the output node VOUT as high as an activation level VDD of the output boost signal SC4 for the boost period E. The output node VOUT has to have a voltage level 2×VDD obtained by adding the level VDD maintained during the last driving period D and the activation level VDD of the output boost signal SC4 but may have a lower voltage level than the voltage level 2×VDD due to parasitic capacitance CP of the pixel array 110. For example, when the capacitance of the capacitor of the first boost element C1 is the same as the capacitance of the parasitic capacitor CP of the pixel array 110, the output node VOUT has a voltage level {3/2×VDD} obtained by adding the maintained level VDD and a half of the voltage level ½×VDD which refers to a half of the activation level VDD of the output boost signal SC4.

For a last precharge period F subsequent to the boost period E, the first and second control signals SC1 and SC2 may be activated to a logic high level. The second driving element MN2 may drive the control node VPP with the activation level VDD of the first control signal SC1 for the last precharge period F. The control node VPP may be charged as much as the voltage level {VDD−Vth} obtained by subtracting a threshold voltage Vth of the second driving element MN2 from the activation level VDD of the first control signal SC1 by the second boost element C2. Accordingly, the first driving element MN1 may drive the output node VOUT with the input voltage signal VI based on the control voltage applied (namely, charged) to the control node VPP. The output node VOUT may correspond to the deactivation level VSS of the input voltage signal VI. Consequently, the reset control signal RX may have the deactivation level VSS of the is input voltage signal VI for the last precharge period F.

As is apparent from embodiments of the present disclosure, advantages are provided in that the switching elements included in the pixel and the switching elements included in the row controller are formed of the same type of the transistors so that the fabrication process may be simplified and easy. Moreover, a voltage drop caused by the driving element when the boosted signal is generated may be compensated using signals having normal activation levels instead of a supply voltage.

Since it is possible to generate a boosted signal only using a simple circuit without a voltage generator, for example, a direct current (DC) to DC (DC-DC) converter, for generating a boost voltage, an occupying area of an electronic device may be reduced, and operational reliability of the electronic device may be improved.

While the present invention has been described with respect to specific embodiments, these embodiments are not intended to be restrictive, but rather descriptive. Further, it is noted that embodiments of the present invention may be implemented in various ways through substitution, change, and modification of any of the disclosed embodiments by those skilled in the art without departing from the spirit and/or scope of the present invention as defined by the following claims.

What is claimed is:

1. An electronic device, comprising:
a driving circuit suitable for driving an output node with an input voltage signal based on a control voltage applied to a control node;
a boost circuit suitable for boosting voltage of the output node based on an output boost signal; and
a compensating circuit suitable for applying the control voltage to the control node based on control signals to compensate for voltage drop caused by the driving circuit.

2. The electronic device of claim 1, wherein an activation level of an output voltage signal generated through the output node is higher than an activation level of the input voltage signal.

3. The electronic device of claim 1, wherein an activation level of each of the control signals and an activation level of the output boost signal have a voltage level corresponding to an activation level of the input voltage signal.

4. The electronic device of claim 1, wherein the driving circuit operates for a driving period, and the boost circuit operates for a boost period subsequent to the driving period.

5. The electronic device of claim 4, wherein the driving period and the boost period are continuous without a gap.

6. The electronic device of claim 1,
wherein the driving circuit includes a first driving element,
wherein the boost circuit includes a first boost element,
wherein capacitance of the first boost element is set in consideration of parasitic capacitance of a load coupled to the output node.

7. The electronic device of claim 1, wherein the control signals include first to third control signals, and wherein the compensating circuit includes:
a second driving element suitable for driving the control node with the first control signal based on the second control signal; and
a second boost element suitable for boosting the control node as much as an activation level of the first control signal based on the third control signal.

8. The electronic device of claim 7, wherein the second driving element operates for a precharge period, and the second boost element operates for a compensating period subsequent to the precharge period.

9. An electronic device, comprising:
a first driving element coupled between an input node to which an input voltage signal is applied and an output node through which an output voltage signal is outputted, the first driving element operating based on a control voltage applied to a control node;
a first boost element coupled between the output node and a first node to which an output boost signal is inputted;
a second driving element coupled between a second node to which a first control signal is inputted and the control node, and operating based on a second control signal; and
a second boost element coupled between the control node and a third node to which a third control signal is inputted.

10. The electronic device of claim 9, wherein an activation level of the output voltage signal is greater than an activation level of the input voltage signal.

11. The electronic device of claim 9, wherein each of an activation level of the first control signal, an activation level of the second control signal, an activation level of the third control signal and an activation level of the output boost signal has a voltage level corresponding to an activation level of the input voltage signal.

12. The electronic device of claim 9, wherein the first and second driving elements and the first boost element operate for a driving period, and the second boost element operates for a boost period subsequent to the driving period.

13. The electronic device of claim 12, wherein the driving period and the boost period are continuous without a gap.

14. The electronic device of claim 9,
wherein the first driving element drives the output node with an activation level of the input voltage signal for an initial period of a driving period, which also includes a medium driving period and a last driving period,
wherein the first boost element boosts the output node as much as an activation level of the output boost signal for a boost period subsequent to the driving period,
wherein the second driving element drives the control node with an activation level of the first control signal for an initial precharge period prior to the driving period, drives the control node with a deactivation level of the first control signal for the last driving period, and drives the control node with the activation level of the first control signal for a last precharge period subsequent to the boost period,
wherein the second boost element boosts the control node as much as an activation level of the third control signal for the medium driving period.

15. The electronic device of claim 9, wherein capacitance of the first boost element is set in consideration of parasitic capacitance of a load coupled to the output node.

16. An electronic device, comprising:
a pixel array suitable for generating pixel signals based on a reset control signal, a transmission control signal and a selection control signal; and
a controller suitable for generating any one of the reset control signal, the transmission control signal and the selection control signal based on a supply voltage, and generating remaining signals among the reset control signal, the transmission control signal and the selection control signal based on various signals generated for a set period instead of the supply voltage,
wherein each of the various signals has a first activation level,
wherein each of the remaining signals has a second activation level that is greater than the first activation level.

17. The electronic device of claim 16, wherein the various signals include an input voltage signal, an output boost signal and the first to third control signals,
wherein the controller includes:
a first driving element coupled between an input node to which the input voltage signal is applied and an output node where the remaining signals are generated, and operating based on a control voltage applied to a control node;
a first boost element coupled between the output node and a first node to which the output boost signal is inputted;
a second driving element coupled between a second node to which a first control signal is inputted and the control node, and operating based on a second control signal; and
a second boost element coupled between the control node and a third node to which a third control signal is inputted.

18. The electronic device of claim 17, wherein capacitance of the first boost element is set in consideration of parasitic capacitance of the pixel array coupled to the output node.

19. The electronic device of claim 17, wherein the pixel array includes pixels for generating the pixel signals, and switching elements included in each of the pixels and the first and second driving elements include the same type of transistors.

20. The electronic device of claim 17,
wherein the first driving element drives the output node with an activation level of the input voltage signal for an initial driving period of a driving period, which also includes a medium driving period and a last driving period,
wherein the first boost element boosts the output node as much as an activation level of the output boost signal for a boost period subsequent to the driving period,
wherein the second driving element drives the control node with an activation level of the first control signal for an initial precharge period prior to the driving period, drives the control node with a deactivation level of the first control signal for the last driving period, and drives the control node with the activation level of the first control signal for a last precharge period subsequent to the boost period,
wherein the second boost element boosts the control node as much as an activation level of the third control signal for the medium driving period.

\* \* \* \* \*